UNITED STATES PATENT OFFICE.

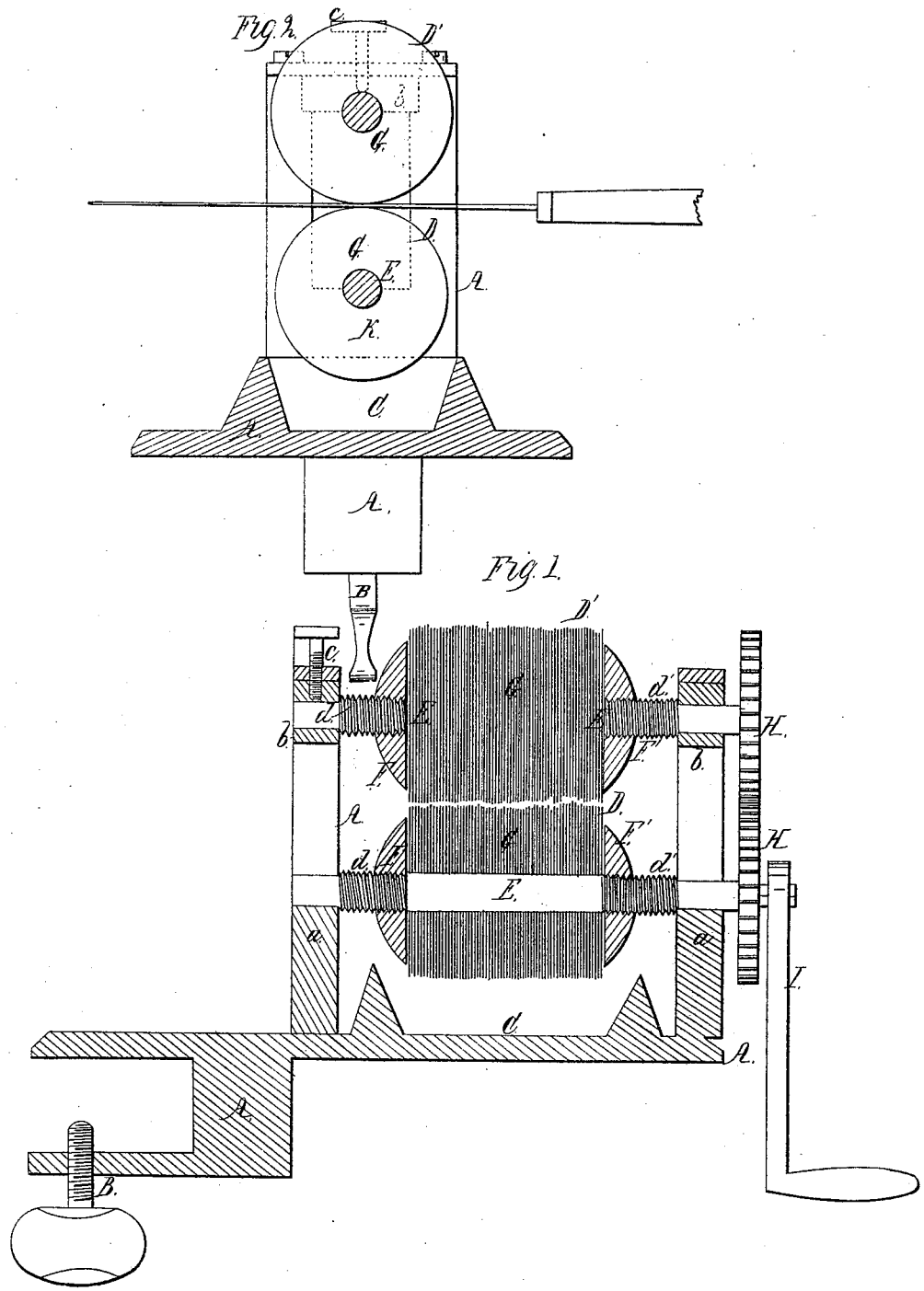

G. M. MORRIS AND J. NEWTON, OF WATERTOWN, CONNECTICUT.

MACHINE FOR SCOURING KNIVES.

Specification of Letters Patent No. 13,883, dated December 4, 1855.

*To all whom it may concern:*

Be it known that we, G. M. MORRIS and J. NEWTON, of Watertown, in the county of Litchfield and State of Connecticut, have invented a new and useful Improvement in Machines for Scouring Knives; and we do hereby declare that the following is a full, clear, and exact description of the same, reference being had to the accompanying drawings, forming part of this specification, in which—

Figure 1, is a vertical longitudinal section of a machine constructed after our invention. Fig. 2 is a vertical transverse section of the same.

Similar letters of reference in each of the two figures indicate corresponding parts.

The nature of our invention consists in the employment of two elastic absorbent scouring rollers in combination with a stationary trough, for the purpose of scouring knives said rollers and trough being constructed and arranged as hereinafter described.

To enable others skilled in the art to make and use our invention, we will proceed to describe its construction and operation.

A, represents a cast iron frame to be secured to a table by a set screw B.

C, is the trough, cast on the bottom of the frame A, for holding water and other suitable cleansing material.

D, D', are the revolving scouring rollers arranged one above the other over the trough C. The roller D, rests on stationary bearings *a*, *a*, of the frame, and D', on sliding bearings *b*, *b*, and is made adjustable by a set screw *c*, so as to accommodate knives of different thicknesses. Each of these rollers is formed by providing a shaft E, having screw threads *d*, *d'*, formed on it, and then screwing a circular metallic disk F, on one of said screw threads as shown and then sliding a number of ring disks G, shown in red, formed of some woolen or absorbent substance over the shaft and then screwing another metallic disk F', on the shaft in order to force the woolen disks compactly together and in concert with the disk F, confine and hold them thus, as shown in the drawing. The disks F, F', are made movable so that the scouring substance after being worn down may be removed and a new one substituted for it. By having them removable the scouring surface can be made more or less solid as deemed necessary, this arangement also admits of the scouring surface being formed of a number of disks which is best as it will when thus made absorb and hold the cleansing material more readily and perfectly.

The rollers D, D', are driven by cog gearing H, H, which is set in motion by a crank I, on the shaft of the lower roller.

In order to scour a knife with this machine it is only necessary to fill the trough B, with some suitable cleansing material place the knife between the rollers as shown and then set the rollers in motion by turning the crank; the knife of course must be moved back and forth as the rollers revolve.

By this machine both sides of the knife can be scoured at once as the lower roller in revolving absorbs the cleansing material and feeds it to the upper roller and consequently both act upon the knife with like effect.

This machine is very simple and cheap and can be operated with great ease even by a child, owing to the scouring surfaces rolling instead of sliding over the knife.

What we claim as our invention and desire to secure by Letters Patent, is,

The machine herein described and shown for scouring knives consisting of two scouring rollers D, D', and a trough for containing the cleansing material said rollers being arranged over each other above the trough and each of them formed of a series of woolen or other absorbent elastic disks arranged on a screw shaft E, and forced and confined compactly together by two movable metallic disks F, F', substantially as and for the purpose set forth.

G. M. MORRIS.
J. NEWTON.

Witnesses:
ELIZABETH CURTIS,
HOLBROOK CURTIS.